(12) United States Patent
Tamakoshi et al.

(10) Patent No.: US 8,003,247 B2
(45) Date of Patent: Aug. 23, 2011

(54) BUTTON-TYPE ALKALINE BATTERY AND METHOD OF MANUFACTURING THE SAME

(75) Inventors: Hiromi Tamakoshi, Ibaraki (JP); Hisanori Sugahara, Ibaraki (JP); Yoshihisa Hirose, Ibaraki (JP); Minoru Ichijo, Ibaraki (JP); Kiyoshi Sato, Ibaraki (JP)

(73) Assignee: Hitachi Maxell Energy, Ltd., Kyoto (JP)

( * ) Notice: Subject to any disclaimer, the term of this patent is extended or adjusted under 35 U.S.C. 154(b) by 945 days.

(21) Appl. No.: 11/093,865

(22) Filed: Mar. 29, 2005

(65) Prior Publication Data
US 2005/0170244 A1 Aug. 4, 2005

Related U.S. Application Data (63) Continuation of application No. PCT/JP2004/018304, filed on Dec. 8, 2004.

(30) Foreign Application Priority Data

Dec. 10, 2003 (JP) ................ 2003-411520

(51) Int. Cl.
*H01M 6/04* (2006.01)
*H01M 2/04* (2006.01)
*H01M 2/08* (2006.01)
*H01M 4/42* (2006.01)

(52) U.S. Cl. ........ 429/163; 429/171; 429/175; 429/344; 429/229

(58) Field of Classification Search .......... 429/231, 429/223, 174, 230, 152, 175
See application file for complete search history.

(56) References Cited

U.S. PATENT DOCUMENTS

| 5,168,018 | A | * | 12/1992 | Yoshizawa et al. | 429/300 |
| 5,306,580 | A | * | 4/1994 | Mansfield et al. | 429/175 |
| 5,541,021 | A | | 7/1996 | Watanabe et al. | |
| 5,721,065 | A | * | 2/1998 | Collien et al. | 429/29 |

(Continued)

FOREIGN PATENT DOCUMENTS

CN 1430800 7/2003

(Continued)

OTHER PUBLICATIONS

Patent Abstract of JP5266881, Publication Date Oct. 15, 1993, supplied from the esp@cenet database, 1 page.

(Continued)

*Primary Examiner* — Barbara L Gilliam
*Assistant Examiner* — Maria J Laios
(74) *Attorney, Agent, or Firm* — Birch, Stewart, Kolasch & Birch, LLP (57) ABSTRACT

A button-type alkaline battery in which an anode 3 containing an anode active material and an alkaline electrolyte is disposed in a sealed space formed by sealing a cathode housing 4 with an anode sealing member 5, with a gasket 6 being interposed between the cathode housing 4 and the anode sealing member 5. The anode active material includes mercury-free zinc or a mercury-free zinc alloy. The button-type alkaline battery includes a metal layer 7 that is disposed between and in contact with the anode sealing member 5 and the anode 3. The metal layer 7 includes a base material containing zinc, and at least one metal M selected from the group consisting of indium, bismuth, and tin, with the metal M having segregated in the base material.

9 Claims, 3 Drawing Sheets

U.S. PATENT DOCUMENTS

| | | | |
|---|---|---|---|
| 5,721,068 | A | 2/1998 | West et al. |
| 6,040,088 | A | 3/2000 | Bennett et al. |
| 6,221,530 | B1 | 4/2001 | Turner et al. |
| 6,258,484 | B1 | 7/2001 | Nagata et al. |
| 6,461,768 | B1 | 10/2002 | Kitamura et al. |
| 6,723,469 | B1 * | 4/2004 | Watanabe et al. ............. 429/231 |
| 2002/0010261 | A1 * | 1/2002 | Callahan et al. ............. 524/832 |
| 2002/0127469 | A1 * | 9/2002 | Mori et al. ................... 429/174 |
| 2003/0082456 | A1 | 5/2003 | Ho |
| 2004/0043292 | A1 * | 3/2004 | Christian et al. ............. 429/223 |

FOREIGN PATENT DOCUMENTS

| | | |
|---|---|---|
| EP | 0 457 354 A1 | 11/1991 |
| EP | 0582293 * | 4/1993 |
| EP | 0582293 A2 * | 4/1993 |
| EP | 0 582 293 A2 | 2/1994 |
| EP | 0582293 * | 9/1994 |
| FR | 2 742 927 | 6/1997 |
| JP | 4-286865 A | 10/1992 |
| JP | 5-266881 | 10/1993 |
| JP | 5-314967 | 11/1993 |
| JP | 6-89724 | 3/1994 |
| JP | 6-163026 | 6/1994 |
| JP | 8-130021 A | 5/1996 |
| JP | 8-222233 A | 8/1996 |
| JP | 2000-156207 | 6/2000 |
| JP | 2000-215888 | 8/2000 |
| JP | 2002-93413 | 3/2002 |
| JP | 2002-184395 | 6/2002 |
| WO | WO-97/17737 | 5/1997 |
| WO | WO 01/91224 A1 | 11/2001 |

OTHER PUBLICATIONS

Patent Abstract of JP6089724, Publication Date Mar. 29, 1994, supplied from the esp@cenet database, 1 page.

Patent Abstract of JP6163026, Publication Date Jun. 10, 1994, supplied from the esp@cenet database, 1 page.

Patent Abstract of JP2000156207, Publication Date Jun. 6, 2000, supplied from the esp@cenet database, 1 page.

Patent Abstract of JP2000215888, Publication Date Aug. 4, 2000, supplied from esp@cenet database, 1 page.

Patent Abstract of JP2002093413, Publication Date Mar. 29, 2002, supplied from esp@cenet database, 1 page.

Patent Abstract of JP2002-184395, Publication Date Jun. 28, 2002, supplied from esp@cenet database, 1 page.

* cited by examiner

BUTTON-TYPE ALKALINE BATTERY AND METHOD OF MANUFACTURING THE SAME

TECHNICAL FIELD

The present invention relates to a button-type alkaline battery and a method of manufacturing the same.

BACKGROUND ART

A button-type alkaline battery has a configuration in which an anode, a separator, and a cathode are disposed in a sealed space formed by sealing a cathode housing with an anode sealing member, with a gasket being interposed between the cathode housing and the anode sealing member. In conventional button-type alkaline batteries, hydrogen gas may be generated during storage, and the generation of hydrogen gas then may cause the batteries to swell or deteriorate in capacity in some cases.

The generation of hydrogen gas is caused by the following two types of reactions. The first reaction is a self-corrosion reaction of zinc that is contained in the anode as an anode active material. Zinc dissolves in an alkaline electrolyte while generating hydrogen gas. The second reaction is a local cell reaction that is caused at the interface between the anode sealing member and the anode containing zinc as an anode active material. When zinc and copper that is contained in the anode-side surface (the inner surface) of the anode sealing member come into contact with each other in the presence of an alkaline electrolyte, a local cell is formed. This local cell reaction decomposes water contained in the alkaline electrolyte and thereby generates hydrogen gas. The generation of hydrogen gas that is caused by the local cell reaction continues until zinc that has dissolved in the alkaline electrolyte deposits on the inner surface of the anode sealing member to form a zinc layer on the inner surface of the anode sealing member. Zinc has a higher hydrogen overpotential than that of copper. Hence, when the zinc layer is formed, the generation of hydrogen gas that is caused by the local cell reaction is inhibited. However, the generation of hydrogen gas that is caused by the self-corrosion reaction of zinc contained in the zinc layer continues.

The conventional button-type alkaline batteries employ amalgamated zinc powder as an anode active material for the purpose of inhibiting the above-mentioned generation of hydrogen gas. When the amalgamated zinc powder is used as an anode active material, mercury whose hydrogen overpotential is higher than that of zinc inhibits the self-corrosion reaction of the zinc. In addition, when the amalgamated zinc powder is used as an anode active material, a zinc-mercury alloy layer is formed on the anode-side surface of the anode sealing member. The zinc-mercury alloy layer is formed through the solid phase diffusion of mercury in a zinc layer formed on the inner surface of the anode sealing member.

When the zinc-mercury alloy layer is formed on the inner surface of the anode sealing member, the generation of hydrogen gas that is caused by the local cell reaction is inhibited. Furthermore, the self-corrosion reaction of the zinc contained in the zinc-mercury alloy layer also is inhibited by the mercury contained in the zinc-mercury alloy layer. Accordingly, the generation of hydrogen gas that is caused by the self-corrosion reaction also is inhibited.

Recently, from the viewpoint of environmental pollution control, it has been demanded strongly to allow the anode active material to be free from mercury. A mercury-free zinc alloy powder that corrodes less has already been used practically as an anode active material. This zinc alloy powder contains zinc, as well as, for instance, aluminum, bismuth, or indium. The aluminum, bismuth, or indium improves the corrosion resistance of the zinc. Cylindrical alkaline batteries have a configuration in which an anode is not in contact with an anode sealing member. Hence, the problem of hydrogen gas generation that is caused by the local cell reaction does not arise. The above-mentioned zinc alloy powder therefore has been used already as an anode active material.

On the other hand, in the case of button-type alkaline batteries, when the above-mentioned zinc alloy powder simply is used instead of the amalgamated zinc powder, a problem arises that the batteries may swell and deteriorate in capacity particularly during high temperature storage.

When the above-mentioned zinc alloy powder is used as an anode active material, the self-corrosion reaction of the zinc contained in the zinc alloy powder included in the anode can be inhibited. Accordingly, the generation of hydrogen gas that is caused by the self-corrosion reaction of the zinc can be inhibited. The zinc contained in the zinc layer formed on the inner surface of the anode sealing member, however, tends to be re-corroded (re-dissolved) by an alkaline electrolyte. Hence, even when the generation of hydrogen gas that is caused by the local cell reaction can be inhibited through the formation of the zinc layer, hydrogen gas is generated through re-corrosion of the zinc contained in the zinc layer. This generation of hydrogen gas is accompanied by the problem that the batteries may swell and deteriorate in capacity. This problem becomes conspicuous particularly during high temperature storage of the batteries.

In order to solve the above-mentioned problems, it has been proposed to preform a metal layer containing metal whose hydrogen overpotential is higher than that of copper, such as, for instance, zinc, tin, lead, or indium, on the anode-side surface of the anode sealing member before the assembly of a battery. The above-mentioned metal layer can be formed by, for instance, plating or vapor deposition (see, for example, Patent Documents 1 to 4).

Patent Document 1: JP5(1993)-266881A
Patent Document 2: JP6(1994)-89724A
Patent Document 3: JP6(1994)-163026A
Patent Document 4: JP2000-156207A However, in order to preform the metal layer on the inner surface of the anode sealing member before the assembly of a battery, special processes such as, for instance, a plating process are required.

The present invention provides a button-type alkaline battery in which mercury-free zinc or a mercury-free zinc alloy is used as an anode active material. In the button-type alkaline battery of the present invention, the generation of hydrogen gas is inhibited and the battery is prevented from swelling and deteriorating in capacity without using processes, such as a plating process, which are not employed conventionally.

DISCLOSURE OF THE INVENTION

A button-type alkaline battery of the present invention includes an anode containing an anode active material and an alkaline electrolyte, with the anode being disposed in a sealed space formed by sealing a cathode housing with an anode sealing member, with a gasket being interposed between the cathode housing and the anode sealing member. The button-type alkaline battery of the present invention is characterized in that the anode active material includes mercury-free zinc or a mercury-free zinc alloy, the button-type alkaline battery includes a metal layer that is disposed between and in contact with the anode sealing member and the anode, and the metal layer includes a base material containing zinc, and at least one metal M selected from the group consisting of indium, bismuth, and tin, with the metal M having segregated in the base material.

A method of manufacturing a button-type alkaline battery of the present invention is a method of manufacturing a button-type alkaline battery in which an anode containing an anode active material and an alkaline electrolyte is disposed in a sealed space formed by sealing a cathode housing with an anode sealing member, with a gasket being interposed between the cathode housing and the anode sealing member. The method of manufacturing a button-type alkaline battery of the present invention is characterized in that: the method includes a process of forming a metal layer on a surface of the anode sealing member to be located on the side of the anode by leaving the anode and the anode sealing member to stand for a predetermined period of time, with the anode and the anode sealing member being disposed so as to be in contact with each other; the anode active material includes mercury-free zinc or a mercury-free zinc alloy; the anode includes at least one metal ion selected from the group consisting of an indium ion, a bismuth ion, and a tin ion; and the metal layer includes a base material containing zinc, and at least one metal M selected from the group consisting of indium, bismuth, and tin, with the metal M having segregated in the base material.

BRIEF DESCRIPTION OF THE DRAWINGS

FIG. 2A is a partial cross-sectional view showing an example of the button-type alkaline battery according to the present invention, while

BEST MODE FOR CARRYING OUT THE INVENTION

Embodiment 1

In Embodiment 1, the description is directed to an example of the method of manufacturing a button-type alkaline battery according to the present invention.

The method of manufacturing a button-type alkaline battery according to the present embodiment is a method of manufacturing a button-type alkaline battery in which an anode containing an anode active material and an alkaline electrolyte is disposed in a sealed space formed by sealing a cathode housing with an anode sealing member, with a gasket being interposed between the cathode housing and the anode sealing member.

Figure 1:
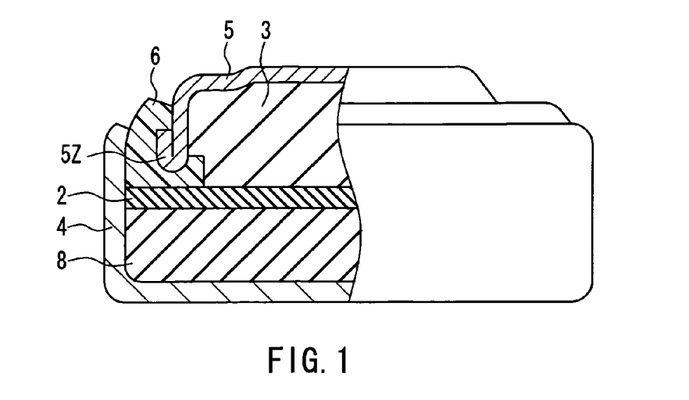
FIG. 1 is a partial cross-sectional view showing an example of the method of manufacturing a button-type alkaline battery according to the present invention.

As shown in FIG. 1, the method of manufacturing a button-type alkaline battery according to the present embodiment includes a process of forming a metal layer 7 (see FIG. 2A) on the anode 3-side surface of an anode sealing member 5 by leaving the anode 3 and the anode sealing member 5 to stand for a predetermined period of time, with the anode 3 and the anode sealing member 5 being disposed so as to be in contact with each other.

Figure 2A:
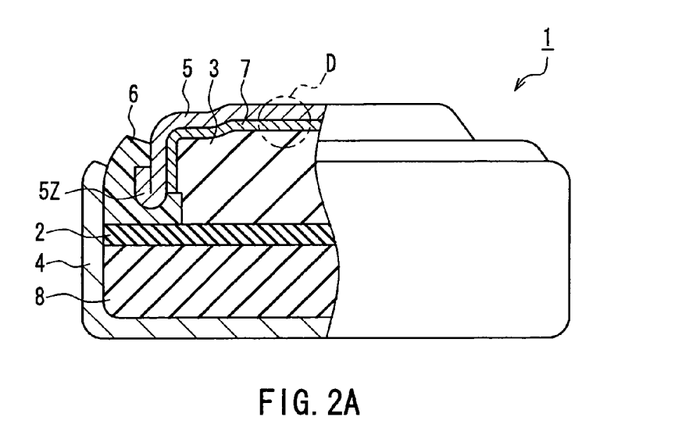

FIG. 1 shows the state obtained immediately after the anode 3 and the anode sealing member 5 are brought into contact with each other. On the other hand, FIG. 2A shows an example of the button-type alkaline battery according to the present embodiment in which the metal layer 7 has been formed between the anode 3 and the anode sealing member 5.

Specifically, a gasket 6 is attached to the periphery of the anode sealing member 5 having a concave portion, for example. At least the anode active material and part of the alkaline electrolyte then are mixed together in the concave portion to provide the anode 3 therein. The anode active material to be used herein can be mercury-free zinc or a mercury-free zinc alloy.

On the other hand, for instance, a mixture of argentous oxide (a cathode active material) and black lead (a conductive auxiliary) is formed into a disk shape and this disk-shaped body then is disposed inside a cathode housing 4. Subsequently, a separator 2 is placed on the disk-shaped body. Thereafter, part of the alkaline electrolyte is allowed to permeate into the disk-shaped body and the separator 2. This results in the state where a cathode 8 and the separator 2 are disposed inside the cathode housing 4.

Next, the cathode housing 4 is sealed with an anode sealing member 5, with the gasket 6 being interposed therebetween. Specifically, after the anode sealing member 5 provided with the anode 3 is attached to the opening portion of the cathode housing 4, with the annular gasket 6 being interposed therebetween, the opening portion of the cathode housing 4 is constricted inwardly (toward the gasket 6 side). Thus, the anode 3, the separator 2, and the cathode 8 are contained in the sealed space formed by sealing the cathode housing 4 with the anode sealing member 5, with the gasket 6 being interposed between the cathode housing 4 and the anode sealing member 5.

When the anode active material is mixed with the alkaline electrolyte, immediately thereafter zinc contained in the anode active material starts dissolving. The zinc thus dissolved starts depositing on the anode 3-side surface of the anode sealing member 5. While the zinc deposits, at least one metal ion $M_i$ selected from the group consisting of an indium ion, a bismuth ion, and a tin ion, which is contained in the anode 3, also starts depositing. This is left standing for a predetermined period of time in this state. For instance, during the above-mentioned assembly process or during an aging process that is carried out thereafter, the metal layer 7 (see FIG. 2A) is formed on the anode 3-side surface of the anode sealing member 5. The metal layer 7 includes a base material containing zinc, and at least one metal M selected from the group consisting of indium, bismuth, and tin, with the metal M having segregated in the base material.

With the method of manufacturing a button-type alkaline battery according to the present embodiment, the metal layer 7 including a material, for instance, zinc whose hydrogen overpotential is higher than copper or a copper alloy, that is contained in the anode-side surface of the anode sealing member 5 is formed between the anode 3 and the anode sealing member 5. Accordingly, a local cell reaction can be inhibited. In addition, since the metal layer 7 contains the metal M whose hydrogen overpotential is higher than zinc, the self-corrosion reaction of the zinc that is contained in the metal layer 7 also is inhibited.

As described above, with the method of manufacturing a button-type alkaline battery according to the present embodiment, the local cell reaction and the self-corrosion reaction of zinc are inhibited and therefore the generation of hydrogen gas accompanying those reactions also is inhibited. Thus, with the method of manufacturing a button-type alkaline battery according to the present embodiment, a button-type alkaline battery can be provided that is prevented from swelling and deteriorating in capacity that are caused due to the generation of hydrogen gas.

The anode is prepared through the mixing of at least the anode active material and part of the alkaline electrolyte. Mercury-free zinc powder or mercury-free zinc alloy powder is used for the anode active material.

The alkaline electrolyte contains at least an aqueous solution of alkali metal hydroxide. Examples of the above-mentioned alkali metal hydroxide include potassium hydroxide, sodium hydroxide, lithium hydroxide, etc. One of alkali metal hydroxides can be used alone or a mixture of two or more of them may be used, in preparing the aqueous solution of alkali metal hydroxide.

Figure 3:
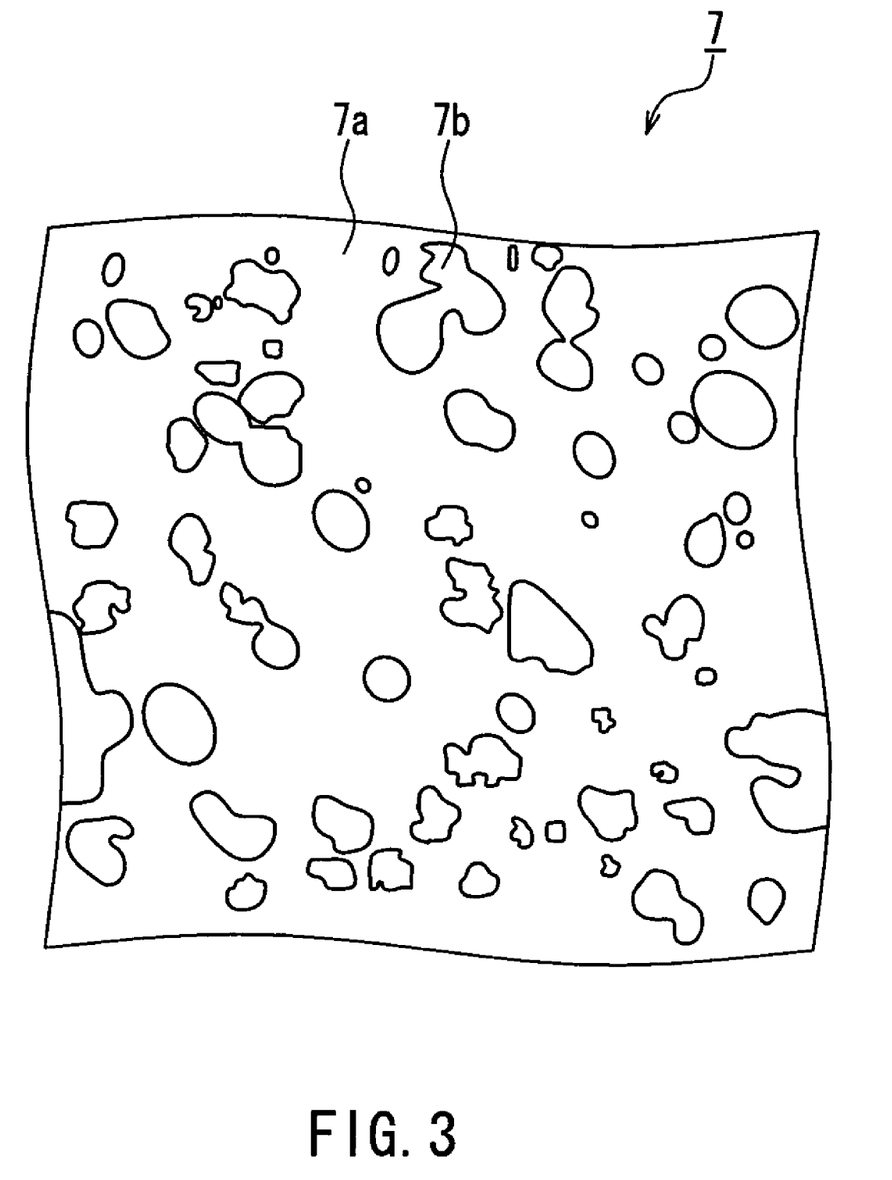
FIG. 3 is a schematic view showing the anode-side surface of a metal layer included in the button-type alkaline battery shown in FIG. 2A.

Preferably, the alkaline electrolyte includes at least one metal ion $M_i$ selected from the group consisting of an indium ion, a bismuth ion, and a tin ion. Such an alkaline electrolyte is obtained by dissolving at least one compound selected from the group consisting of an indium compound, a bismuth compound, and a tin compound, in an aqueous solution of alkali metal hydroxide. When the alkaline electrolyte contains the above-mentioned metal ion $M_i$, at least one metal M selected from the group consisting of indium, bismuth, and tin is allowed to segregate uniformly in the zinc layer (the base material) that is formed on the inner surface of the anode sealing member 5. That is, as shown in FIG. 3, a plurality of segregation parts 7b formed of the metal M are included in the anode 3-side surface of the metal layer 7 that includes the base material 7a containing zinc and the above-mentioned metal M that has segregated in the base material 7a. The plurality of segregation parts 7b are formed dispersedly without concentrating in one place. In this context, the segregation parts 7b denote regions where the metal M that has segregated at the anode 3-side surface of the base material 7a exists continuously.

The indium compound to be dissolved in the aqueous solution of alkali metal hydroxide is not particularly limited. Examples of the indium compound include compounds such as indium hydroxide, indium oxide, indium sulfate, etc. More specifically, preferable indium compounds include indium hydroxide, indium oxide, indium sulfate, indium sulfide, indium nitrate, indium bromide, indium chloride, etc. Indium hydroxide is particularly preferable. An aqueous solution of sodium hydroxide in which the indium compound dissolves readily is preferable as the aqueous solution of alkali metal hydroxide.

The bismuth compound and the tin compound also are not particularly limited and can be, for instance, bismuth hydroxide, bismuth oxide, or bismuth sulfate and tin hydroxide, tin oxide, or tin sulfate, respectively.

The alkaline electrolyte may contain a zinc ion as required. When the alkaline electrolyte contains a zinc ion, the metal layer 7 is formed further quickly. The alkaline electrolyte containing a zinc ion can be obtained by, for instance, dissolving zinc oxide in an aqueous solution of alkali metal hydroxide.

The alkaline electrolyte may contain a titanium ion, a zirconium ion, or a silicon ion as required. When the alkaline electrolyte contains such an ion, it can be expected that for instance, load characteristics are improved. The alkaline electrolyte containing a titanium ion, a zirconium ion, or a silicon ion can be obtained by dissolving, for instance, a titanium compound such as titanium oxide, a zirconium compound such as zirconium oxide, a silicate compound, in an aqueous solution of alkali metal hydroxide.

The alkaline electrolyte may be in a liquid state or may have been gelled by a gellant. The gellant to be used herein can be, for instance, sodium polyacrylate, carboxymethyl cellulose, etc.

Preferably, the alkali metal hydroxide contained in the alkaline electrolyte has a concentration of 20 wt. % to 40 wt. %. This is because when the concentration of the alkali metal hydroxide is in the above-mentioned range, the alkaline electrolyte has improved conductivity. More preferably, the alkali metal hydroxide contained in the alkaline electrolyte has a concentration of 20 wt. % to 35 wt. %.

It is preferable that the concentration of the at least one metal ion $M_i$ selected from the group consisting of an indium ion, a bismuth ion, and a tin ion, which is contained in the alkaline electrolyte, be at least 100 ppm (parts per million by mass) so that a sufficiently large amount of at least one metal M selected from the group consisting of indium, bismuth, and tin segregates in the base material. The concentration of the metal ion $M_i$ is more preferably at least 400 ppm and further preferably at least 700 ppm. The upper limit of the concentration of the metal ion $M_i$ is not particularly limited but may be 1500 ppm or lower in general.

However, the indium compound and the bismuth compound are hard to dissolve in an aqueous solution of alkali metal hydroxide. When the indium compound or the bismuth compound simply is mixed with an alkaline electrolyte containing alkali metal hydroxide whose concentration is, for instance, in the above-mentioned concentration range (20 wt. % to 40 wt. %), the concentration of the indium ion or bismuth ion contained in the alkaline electrolyte is not more than about 20 ppm. Accordingly, in the method of manufacturing a button-type alkaline battery according to the present embodiment, it is preferable that the alkaline electrolyte be prepared by the following method, for example.

First, a certain amount of alkali metal hydroxide that is required for preparing the alkaline electrolyte is mixed with a part of a certain amount of water that also is required for preparing the alkaline electrolyte. This mixture is stirred and thereby an aqueous solution of alkali metal hydroxide with high alkali concentration is produced. That is, all the alkali metal hydroxide is dissolved with the smallest possible amount of water.

Specifically, the amount of the water to be used in this stage is preferably 15 wt. % to 75 wt. %, more preferably 20 wt. % to 60 wt. % of the total amount of water to be used in the end. Furthermore, the alkali metal hydroxide to be used in this stage is preferably at least 45 wt. % of the total weight of water and alkali metal hydroxide.

The indium compound or the bismuth compound dissolves readily in the aqueous solution of high concentration alkali metal hydroxide thus prepared. Accordingly, when an indium compound or a bismuth compound is mixed with an aqueous solution of high concentration alkali metal hydroxide, an alkaline electrolyte including an indium ion or bismuth ion whose concentration is high can be prepared easily.

In the process of dissolving alkali metal hydroxide in water, the temperature of the aqueous solution of alkali metal hydroxide rises to a several tens of degrees centigrade due to the heat generated by hydration. This temperature rise allows an aqueous solution in which about 50 wt. % (saturated concentration) of alkali metal hydroxide has been dissolved to be prepared readily. Furthermore, the higher the concentration of alkali metal hydroxide contained in the aqueous solution and the higher the temperature of the aqueous solution, the easier the dissolution of an indium compound or a bismuth compound.

After the alkali metal hydroxide is dissolved in water, an indium compound or a bismuth compound may be added to the aqueous solution of alkali metal hydroxide. However, the alkali metal hydroxide and the indium compound or the bismuth compound may be dissolved in water at the same time.

In the case where an alkaline electrolyte additionally containing a zinc ion is prepared, it is preferable that zinc oxide be added to an aqueous solution of high concentration alkali metal hydroxide or be added to water together with the alkali metal hydroxide and the indium compound or the like at the same time. In this case, the zinc oxide also can dissolve readily.

In some cases, the indium compound or the bismuth compound can not dissolve completely and a part thereof may remain undissolved in water depending on the type and amount of the indium compound or the bismuth compound or the degree of stirring. In such cases, the undissolved indium compound or bismuth compound may be filtrated to be removed or may not be removed.

Next, the rest of the water is added to the high concentration alkaline electrolyte to allow the alkaline electrolyte to have a desired alkali concentration. Dilution of the high-concentration alkaline electrolyte may be completed through dilution that is carried out once or several times.

There is no particular limitation in upper limit of the concentration of at least one metal ion $M_i$ selected from the group consisting of an indium ion, a bismuth ion, and a tin ion, which is contained in the alkaline electrolyte thus obtained. However, when the concentration of the metal ion $M_i$ approaches the saturated concentration, it becomes difficult to additionally dissolve at least one compound selected from the group consisting of an indium compound, a bismuth compound, and a tin compound. Hence, it is preferable that the concentration of the metal ion $M_i$ be practically 1000 ppm or lower. The lower limit of the above-mentioned metal ion $M_i$ also is not particularly limited but is preferably at least 100 ppm in general.

Preferably, the anode contains at least one compound selected from the group consisting of an indium compound, a bismuth compound, and a tin compound apart from the at least one compound selected from the group consisting of an indium compound, a bismuth compound, and a tin compound that is used for preparing the alkaline electrolyte. This is because when the anode contains the above-mentioned compound, the mercury-free zinc or mercury-free zinc alloy, which is an anode active material, can be prevented further effectively from corroding.

The above-mentioned indium compound is not particularly limited. Examples of the indium compound include indium hydroxide, indium oxide, indium sulfate, indium sulfide, indium nitrate, indium bromide, indium chloride, etc. However, indium hydroxide or indium oxide is particularly preferable.

The blending ratio of the indium compound to be contained in the anode is preferably 0.1 weight part to 5 weight parts, more preferably to 3 weight parts, with respect to 100 weight parts of the anode active material.

The bismuth compound and the tin compound each are not particularly limited. However, for instance, a hydroxide, an oxide, or a sulfate compound thereof can be used as in the case of the indium compound.

When a zinc alloy is used as the anode active material, it is preferable that the zinc alloy contain indium. The content of indium that is contained in the zinc alloy is preferably 100 ppm to 800 ppm when consideration is given to the compatibility between the corrosion resistance and the load characteristics. Moreover, it is preferable that the zinc alloy further contain at least one metal selected from the group consisting of bismuth, aluminum, and calcium in consideration of the corrosion resistance. Preferably, the content of bismuth to be contained in the zinc alloy is 10 ppm to 700 ppm while the content of aluminum to be contained in the zinc alloy is 0.5 ppm to 50 ppm.

Preferably, the anode active material has a grain size in a predetermined range and the grain size of the anode active material is in the range of, for instance, 25 mesh to 300 mesh. An excessively large grain size causes deterioration in load characteristics while an excessively small grain size causes zinc to corrode easily. When the grain size of the anode active material is in the range of, for instance, 25 mesh to 300 mesh, an alkali-type button battery can be provided that is excellent in load characteristics and includes an anode active material that is prevented from corroding.

In the present specification, the grain size denotes a value measured using a stainless steel sieve, and the unit "mesh" indicates the number of meshes per inch. When the grain size of the anode active material is in the range of, for instance, 25 mesh to 300 mesh, the anode active material can pass through a 25-mesh sieve but cannot pass through sieves with a larger number of meshes than 300. The sieve to be used herein may be a commercially available one. A sieve formed of wires having a diameter of 0.29 mm is used as the 25-mesh sieve while a sieve formed of wires having a diameter of 0.04 mm is used as the 300-mesh sieve.

The cathode 8 is formed of, for instance, a mixture containing a cathode active material, a conductive auxiliary, and an alkaline electrolyte.

Examples of the cathode active material include manganese dioxide, argentic oxide, nickel oxyhydroxide, a complex oxide of silver and nickel, cobalt, or bismuth, etc. in addition to argentous oxide.

Examples of the conductive auxiliary include carbon black, graphite, etc. besides black lead.

The composition of the alkaline electrolyte contained in the anode 3 may be different from that of the alkaline electrolyte contained in the cathode and the separator. For instance, when compared to the alkaline electrolyte contained in the cathode, the alkaline electrolyte contained in the anode may have a higher alkali concentration and may contain a larger amount of indium ion, bismuth ion, or tin ion.

The separator 2 to be used herein is, for instance, a layered product S formed of a microporous polypropylene film treated to have hydrophilicity, a cellophane film, and a liquid absorption layer such as vinylon-rayon mixture paper.

Figure 2B:
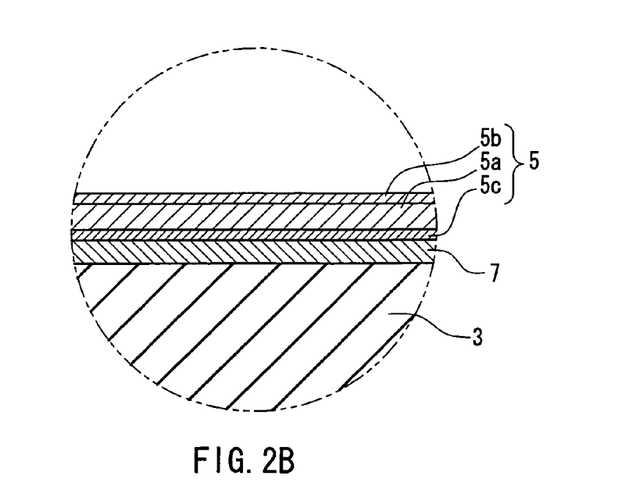
FIG. 2B is an enlarged view of the portion D shown in FIG. 2A.

The material of the anode sealing member 5 is not particularly limited. Generally, however, a three-layer clad sheet (a nickel layer 5b—a stainless steel layer 5a—a copper or copper alloy layer 5c) is used as shown in FIG. 2B. The clad sheet is press-formed in a predetermined shape and thereby the anode sealing member 5 whose surface to be located on the anode 3 side is formed of copper or a copper alloy can be produced. When the surface to be located on the anode 3 side of the anode sealing member 5 includes copper or a copper alloy, the local cell reaction can be inhibited relatively well.

The cathode housing 4 is made of nickel-plated iron, for instance.

The material of the gasket 6 is not particularly limited. Examples thereof, however, include resins of polyethylene, polypropylene or rubbers etc. The gasket 6 has, for instance, an annular shape and has an L-shaped cross section.

Embodiment 2

In Embodiment 2, the description is directed to a button-type alkaline battery produced by the method of manufacturing a button-type alkaline battery according to Embodiment 1.

As shown in FIG. 2A, the button-type alkaline battery 1 of the present embodiment is a button-type alkaline battery in which an anode 3 containing an anode active material and an alkaline electrolyte is disposed in a sealed space formed by sealing a cathode housing 4 with an anode sealing member 5, with a gasket 6 being interposed between the cathode housing 4 and the anode sealing member 5.

The anode 3 contains, for instance, a powdery anode active material and an alkaline electrolyte. The anode active material is made of mercury-free zinc or a mercury-free zinc alloy. The anode 3 contains most of the alkaline electrolyte included in the button-type alkaline battery.

A cathode 8 includes a press-formed body and an alkaline electrolyte with which the press-formed body has been impregnated. The press-formed body is formed by press-forming, into a disk shape, a mixture (powder) of a cathode active material such as argentous oxide, manganese dioxide, argentic oxide, nickel hydroxide, etc. and a conductive auxiliary such as carbon black, graphite, black lead, etc.

A separator 2 is disposed between the cathode 8 and the anode 3.

The anode sealing member 5 is produced through, for instance, drawing of a three-layer clad sheet (a nickel layer 5b—a stainless steel layer 5a—a copper or copper alloy layer 5c). The anode sealing member 5 includes a folded portion 5z. The anode 3-side surface of the anode sealing member 5 contains copper or a copper alloy. The gasket 6 is held strongly by being sandwiched between the cathode housing 4 and the folded portion 5z of the anode sealing member 5.

The button-type alkaline battery 1 includes a metal layer 7 that is disposed between the anode sealing member 5 and the anode 3 and in contact with the anode sealing member 5 and the anode 3. The metal layer 7 includes a base material containing zinc, and at least one metal M selected from the group consisting of indium, bismuth, and tin, with the metal M having segregated in the base material.

For easy recognition, FIGS. 2A and 2B show the metal layer 7 that is thick. However, the metal layer 7 actually is far thinner than the anode sealing member 5.

The button-type alkaline battery 1 of the present embodiment is produced by the method of manufacturing a button-type alkaline battery according to Embodiment 1. Hence, the generation of hydrogen gas is inhibited during storage and the battery is prevented from swelling and deteriorating in capacity.

As shown in FIG. 3, the anode 3-side surface of the metal layer 7 includes a plurality of segregation parts 7b formed of the metal M. Preferably, the maximum diameter of the respective segregation parts 7b is 100 μm or smaller. More preferably, the maximum diameter of the respective segregation parts 7b is 0.1 μm to 10 μm. When such minute segregation parts 7b are formed in the anode 3-side surface of the metal layer 7 dispersedly without concentrating in one place, zinc contained in the base material 7a can be prevented effectively from corroding even if a small amount of metal M is contained in the metal layer 7. Accordingly, the generation of hydrogen gas accompanying the self-corrosion reaction of the zinc can be inhibited effectively.

The thickness of the metal layer 7 differs according to the ratio of the metal M contained in the metal layer 7. The metal layer 7, however, is as thin as less than 10 μm, and the thickness thereof is preferably 0.5 μm to 8 μm. When the metal layer 7 is thinner than 10 μm, the generation of hydrogen gas can be inhibited without reducing the internal volume of the battery considerably, i.e. without hindering an increase in capacity of the battery.

The base material may include a zinc alloy containing at least one metal selected from the group consisting of indium, bismuth, and tin. When the base material contains the zinc alloy, it can be expected that the generation of hydrogen gas further is inhibited. Moreover, the base material may contain both a simple substance of zinc and a zinc alloy.

From the viewpoint of preventing zinc from corroding, it is preferable that the metal M contained in the anode 3-side surface of the metal layer 7 have a greater mass per unit area. An excessively large amount of metal M, however, affects the discharging characteristics adversely. Accordingly, the metal M contained in the anode 3-side surface of the metal layer 7 has preferably a mass per unit area of 0.001 mg/cm$^2$ to 0.125 mg/cm$^2$, more preferably 0.005 mg/cm$^2$ to 0.08 mg/cm$^2$, and further preferably 0.01 mg/cm$^2$ to 0.05 mg/cm$^2$.

The mass per unit area of the metal M contained in the anode 3-side surface of the metal layer 7 can be adjusted through adjustment of the concentration of at least one metal ion $M_i$, which is contained in the alkaline electrolyte, selected from the group consisting of an indium ion, a bismuth ion, and a tin ion. An increase in the concentration of the above-mentioned metal ion $M_i$ that is contained in the alkaline electrolyte allows the metal M to have an increased mass per unit area. On the other hand, a decrease in the concentration of the metal ion $M_i$ allows the metal M to have a reduced mass per unit area.

From the viewpoint of effectively preventing zinc from corroding, it is preferable that a larger amount of the metal M be contained in the total amount of zinc and metal M that are contained in the metal layer 7. An excessively large amount of metal M, however, affects the discharging characteristics adversely. Accordingly, the content of the metal M is preferably 0.01 wt. % to 30 wt. % of the total amount of zinc and metal M that are contained in the metal layer 7. Furthermore, the lower limit of the content of the metal M is preferably at least 0.1 wt. %, more preferably at least 0.5 wt. %. The upper limit of the content of the metal M is preferably 10 wt. % or less, more preferably 5 wt. % or less.

Furthermore, a liquid packing material (not shown in the figure) may be disposed between the gasket 6 and the folded portion 5z of the anode sealing member 5 as shown in FIG. 2A. Examples of the liquid packing material include an asphalt pitch, aliphatic polyamide, fluorine-based oil, etc.

Furthermore, a coating film (not shown in the figure) containing an N-aminomethyl derivative of a triazole compound such as, for instance, benzotriazole may be provided on the surface, which faces the gasket 6, of the folded portion 5z of the anode sealing member 5.

The N-aminomethyl derivative of a triazole compound has strong reactivity to copper. The N-aminomethyl derivative of a triazole compound contained in the coating film therefore chemically bonds strongly to the anode 3-side surface of the anode sealing member 5 containing copper. Hence, when a coating film formed of an N-aminomethyl derivative of a triazole compound is provided on the surface, which faces the gasket 6, of the folded portion 5z of the anode sealing member 5, leakage of the alkaline electrolyte to be caused by the electrochemical creep that is generated at the surface of the copper layer 5c can be prevented certainly from occurring. In this case, a liquid packing material may be disposed between the coating film 9 and the gasket 6. The liquid packing material can prevent the alkaline electrolyte from leaking from between the coating film 9 and the gasket 6.

EXAMPLES

Next, the present invention is described further in detail using examples. The present invention, however, is not limited to those exemplified in the examples.

Example 1

Production of Alkaline Electrolyte

A liquid mixture obtained by adding 550 g of sodium hydroxide (with a purity of 96%), 100 g of zinc oxide (with a purity of 99%), and 10 g of indium hydroxide to 340 g of water was stirred for 20 minutes (at a stirring rate of 1500 rpm). Subsequently, 1010 g of water further was added to the liquid mixture, which then was stirred for another 20 minutes (at a stirring rate of 1500 rpm). The liquid mixture thus obtained was allowed to stand still at room temperature (25° C.) for three days. Thereafter, the supernatant liquid was collected from the liquid mixture and thereby indium hydroxide that remained undissolved was removed. The supernatant liquid then was used as an alkaline electrolyte.

The indium concentration of the alkaline electrolyte was analyzed using an ICP (an inductive coupling plasma emission analyzer) ("IRIS 1000", manufactured by Nippon Jarrell-Ash Co., Ltd.). The indium concentration of the alkaline electrolyte was 789 ppm. Similarly, with respect to the alkaline electrolytes used in the other examples and comparative examples described below, the concentrations of indium ion, bismuth ion, and tin ion each were analyzed using the above-mentioned analyzer.

Production of Battery

A clad sheet (a nickel layer/a stainless steel (SUS-304) sheet/a copper layer) is punched out into a predetermined shape using a press. The clad sheet thus punched out was processed into a shape having a folded portion 5z as shown in FIG. 1. Thus an anode sealing member was produced.

On the other hand, a cathode housing made of nickel-plated iron was prepared.

A mixture composed of 110 mg of argentous oxide and 20 mg of manganese dioxide was prepared as a cathode active material while 2 mg of black lead was prepared as a conductive auxiliary. A mixture obtained by mixing the cathode active material and the conductive auxiliary was press-formed into a disk shape (with an outer diameter of 6.3 mm and a thickness of 0.9 mm). The press-formed body thus obtained was placed in the cathode housing and a separator then was disposed on the press-formed body. Subsequently, the press-formed body and the separator each was impregnated with a small amount of alkaline electrolyte mentioned above. Thus the state where the cathode and the separator were disposed inside the cathode housing was obtained. The separator used herein was a layered product formed of a microporous polypropylene film treated to have hydrophilicity, a cellophane film, and vinylon-rayon mixture paper.

For the anode active material, 37 mg of mercury-free zinc alloy powder (with a grain size of 25 mesh to 300 mesh) was prepared that contained 500 ppm of indium, 400 ppm of bismuth, and 15 ppm of aluminum. In addition, 0.1 weight part of indium hydroxide was prepared with respect to 100 weight parts of the anode active material. The anode active material, the indium hydroxide, and most of the alkaline electrolyte were mixed together in the concave part of the anode sealing member. The mixture thus obtained was used as the anode.

Subsequently, the cathode housing was sealed with the anode sealing member, with the gasket being interposed therebetween. Thereafter, it was left at 60° C. for two days. Thus a button-type alkaline battery (with an outer diameter of 6.8 mm and a thickness of 2.6 mm) was obtained that included a metal layer formed on the anode-side surface of the anode sealing member.

Example 2

Production of Alkaline Electrolyte

A liquid mixture obtained by adding 850 g of potassium hydroxide (with a purity of 85%), 110 g of zinc oxide (with a purity of 99%), and 10 g of indium hydroxide to 525 g of water was stirred for 20 minutes (at a stirring rate of 1500 rpm). Subsequently, 525 g of water further was added to the liquid mixture, which then was stirred for 20 minutes (at a stirring rate of 1500 rpm). The liquid mixture thus obtained was allowed to stand still at room temperature (25° C.) for three days. Thereafter, the supernatant liquid was collected from the liquid mixture and thereby indium hydroxide that remained undissolved was removed. The supernatant liquid then was used as an alkaline electrolyte. The alkaline electrolyte contained 284 ppm of indium ion.

Thereafter, a button-type alkaline battery was produced in the same manner as in Example 1.

Example 3

Production of Alkaline Electrolyte

A liquid mixture obtained by adding 550 g of sodium hydroxide (with a purity of 96%) and 100 g of zinc oxide (with a purity of 99%) to 900 g of water was stirred for 20 minutes (at a stirring rate of 1500 rpm). Subsequently, 10 g of indium hydroxide was added to the liquid mixture, which then was stirred for 20 minutes (at a stirring rate of 1500 rpm). Thereafter, 450 g of water further was added to the liquid mixture, which then was stirred for 20 minutes (at a stirring rate of 1500 rpm). The liquid mixture thus obtained was allowed to stand still at room temperature (25° C.) for three days. Thereafter, the supernatant liquid was collected from the liquid mixture and thereby indium hydroxide that remained undissolved was removed. The supernatant liquid then was used as an alkaline electrolyte. The alkaline electrolyte contained 104 ppm of indium ion.

Thereafter, a button-type alkaline battery was produced in the same manner as in Example 1.

Example 4

A button-type alkaline battery was produced in the same manner as in Example 3 except that 1 weight part of indium hydroxide was mixed with respect to 100 weight parts of anode active material.

Example 5

A button-type alkaline battery was produced in the same manner as in Example 2 except that 1 weight part of each of indium hydroxide and bismuth hydroxide was mixed with respect to 100 weight parts of anode active material, and an alkaline electrolyte having an indium ion concentration of 69 ppm was used.

Example 6

A button-type alkaline battery was produced in the same manner as in Example 5 except that 0.1 weight part of each of indium hydroxide and bismuth hydroxide was mixed with respect to 100 weight parts of anode active material.

Example 7

A button-type alkaline battery was produced in the same manner as in Example 5 except that an alkaline electrolyte was used that contained 35 ppm of indium and 400 ppm of bismuth.

Example 8

A button-type alkaline battery was produced in the same manner as in Example 5 except that 1 weight part of tin oxide ($SnO_2$) was mixed with respect to 100 weight parts of anode active material, and an alkaline electrolyte containing 150 ppm of tin ion was used.

Comparative Example 1

A button-type alkaline battery was produced in the same manner as in Example 2 except that indium hydroxide was not used in preparing the alkaline electrolyte and the anode was free from indium hydroxide.

Comparative Example 2

A button-type alkaline battery was produced in the same manner as in Comparative Example 1 except that zinc powder containing 3 wt. % of mercury was used as the anode active material.

Comparative Example 3

A button-type alkaline battery was produced in the same manner as in Comparative Example 1 except that an indium-plated layer was formed on the inner surface of the anode sealing member beforehand.

Table 1 shows contents of the indium compound, the bismuth compound, and the tin compound with respect to 100 weight parts of the anode active material as well as contents of indium ion, bismuth ion, and tin ion in the alkaline electrolytes, with respect to the button-type alkaline batteries according to Examples 1 to 8 and Comparative Examples 1 to 3.

TABLE 1

| | Content of Compound in anode (Weight Part) | | | Content of Metal Ion $M_i$ in Alkaline Electrolyte (ppm) | | |
|---|---|---|---|---|---|---|
| | In(OH)$_3$ | Bi(OH)$_3$ | SnO$_2$ | In | Bi | Sn |
| Example 1 | 0.1 | 0 | 0 | 789 | 0 | 0 |
| Example 2 | 0.1 | 0 | 0 | 284 | 0 | 0 |
| Example 3 | 0.1 | 0 | 0 | 104 | 0 | 0 |
| Example 4 | 1 | 0 | 0 | 104 | 0 | 0 |
| Example 5 | 1 | 1 | 0 | 69 | 0 | 0 |
| Example 6 | 0.1 | 0.1 | 0 | 69 | 0 | 0 |
| Example 7 | 1 | 1 | 0 | 35 | 400 | 0 |
| Example 8 | 0 | 0 | 1 | 0 | 0 | 150 |
| Comparative Example 1 | 0 | 0 | 0 | 0 | 0 | 0 |
| Comparative Example 2 | 0 | 0 | 0 | 0 | 0 | 0 |
| Comparative Example 3 | 0 | 0 | 0 | 0 | 0 | 0 |

As described below, with respect to each of the button-type alkaline batteries according to Examples 1 to 8 and Comparative Examples 1 to 3, the components of the metal layer were analyzed, the initial discharge capacity was measured, and the discharge capacity was measured after high temperature storage.

Analysis of Components of Metal Layer

Amounts (ppm) of zinc, indium, bismuth, and tin that were contained in the metal layer were measured using an inductive coupling plasma emission analyzer. Table 2 shows mass per unit area of each metal (indium, bismuth, or tin) contained in the anode-side surface of the metal layer as well as the content of each metal indicated with respect to the total amount of zinc and metal M that are contained in the metal layer.

TABLE 2

| | Mass per Unit Area of Metal M contained in anode-Side Surface of Metal Layer (mg/cm$^2$) | | | Content of Metal M in Metal Layer (wt. %) | | |
|---|---|---|---|---|---|---|
| | In | Bi | Sn | In | Bi | Sn |
| Example 1 | 0.020 | 0 | 0 | 0.8 | 0 | 0 |
| Example 2 | 0.014 | 0 | 0 | 0.5 | 0 | 0 |
| Example 3 | 0.012 | 0 | 0 | 0.4 | 0 | 0 |
| Example 4 | 0.021 | 0 | 0 | 1.0 | 0 | 0 |
| Example 5 | 0.020 | 0.026 | 0 | 1.0 | 1.3 | 0 |
| Example 6 | 0.010 | 0.013 | 0 | 0.3 | 0.4 | 0 |
| Example 7 | 0.018 | 0.025 | 0 | 1.0 | 1.4 | 0 |
| Example 8 | 0 | 0 | 0.025 | 0 | 0 | 1.3 |
| Comparative Example 1 | 0 | 0 | 0 | 0 | 0 | 0 |
| Comparative Example 2 | 0 | 0 | 0 | 0 | 0 | 0 |
| Comparative Example 3 | 0.7 | 0 | 0 | 31 | 0 | 0 |

Figure 4:
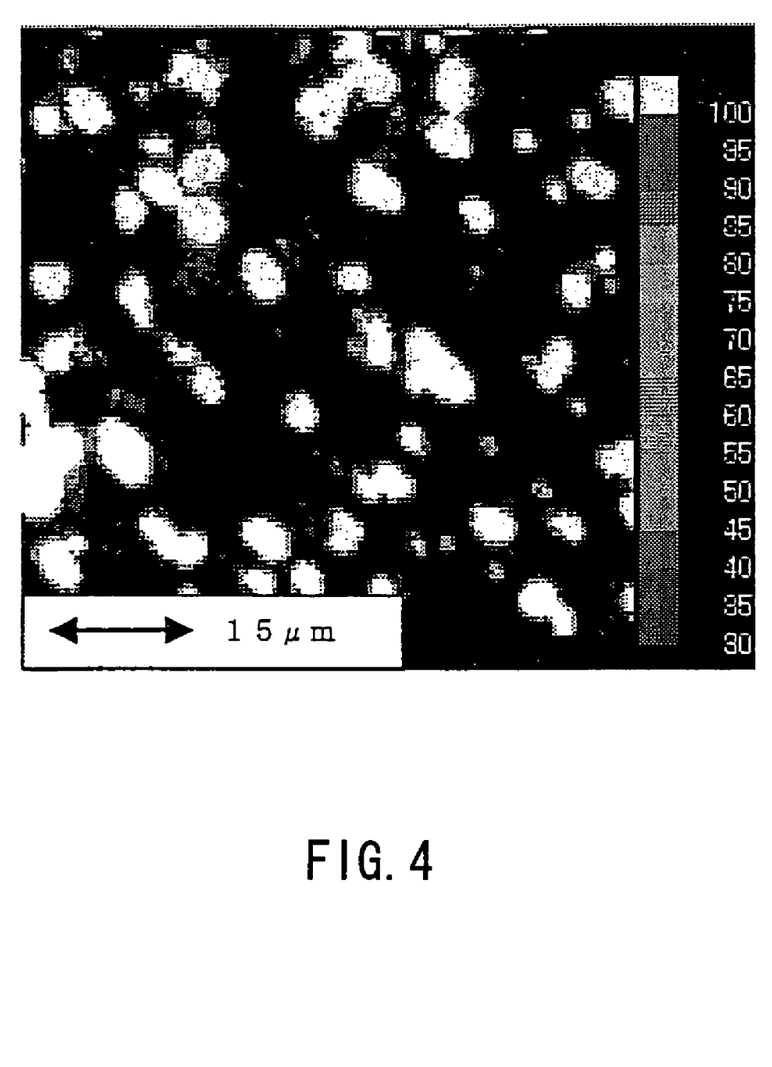
FIG. 4 is a diagram showing the result of analysis of the anode-side surface of a metal layer included in the button-type alkaline battery according to Example 4.

In addition, with respect to the button-type alkaline battery according to Example 4, the anode-side surface of the metal layer was analyzed using an electron probe microanalyzer ("EPMA-1600", manufactured by Shimadzu Corporation). FIG. 4 shows the result of the analysis. The segregation parts are formed of indium.

In FIG. 4, the base material containing zinc is indicated with a black color while the segregation parts formed of indium are indicated with a white color. As shown in FIG. 4, a plurality of segregation parts were present dispersedly in the anode-side surface of the base material. The maximum diameter of each segregation part was about 1 µm to 10 µm. The metal layer had a thickness of about 3 µm while the base material was formed of zinc and a zinc-indium alloy.

The anode-side surfaces of the metal layers of the button-type alkaline batteries according to Examples 7 and 8 were analyzed using an electron probe microanalyzer ("EPMA-1600", manufactured by Shimadzu Corporation). As a result, presence of segregation parts containing bismuth and those containing tin was confirmed. The maximum diameter of these segregation parts was a few hundreds of nanometers to a few tens of micrometers and was all 100 µm or smaller.

Measurement of Initial Discharge Capacity

The button-type alkaline batteries according to Examples 1 to 8 and Comparative Examples 1 to 3 were prepared ten pieces each. A 15-kΩ discharging resistor was connected to each button-type alkaline battery. The button-type alkaline batteries were allowed to discharge at an atmosphere temperature of 20° C. until the final voltage reached 1.2 V, and thereby the discharge capacity was measured. The mean value of discharge capacities of each ten button-type alkaline batteries was calculated as an initial discharge capacity.

Discharge Capacity after High Temperature Storage

The button-type alkaline batteries according to Examples 1 to 8 and Comparative Examples 1 to 3 were prepared ten pieces each. The respective button-type alkaline batteries were stored at an atmosphere temperature of 60° C. for 40 days. Thereafter the discharge capacities thereof were measured in the same manner as described above. The mean value of discharge capacities of each ten batteries was calculated as a discharge capacity obtained after high temperature storage. In addition, the capacity maintenance rate was calculated by the following formula, which is shown in Table 3.

Capacity Maintenance Rate (%)=Discharge Capacity after High Temperature Storage/Initial Discharge Capacity×100    Formula 1

TABLE 3

|  | Capacity Maintenance Rate after High Temperature Storage (%) |
|---|---|
| Example 1 | 97 |
| Example 2 | 94 |
| Example 3 | 91 |
| Example 4 | 98 |
| Example 5 | 99 |
| Example 6 | 94 |
| Example 7 | 98 |
| Example 8 | 91 |
| Comparative Example 1 | 80 |
| Comparative Example 2 | 99 |
| Comparative Example 3 | 97 |

The button-type alkaline batteries according to Examples 1 to 8 each are provided with a metal layer that includes a base material containing zinc, and at least one metal M selected from the group consisting of indium, bismuth, and tin, with the metal M having segregated in the base material. As shown in Table 3, the button-type alkaline batteries according to Examples 1 to 8 have considerably improved capacity maintenance rates after high temperature storage as compared to the button-type alkaline battery according to Comparative Example 1 that is not provided with the metal layer.

Furthermore, it was confirmed that the button-type alkaline batteries according to Examples 1 to 8 had the storage characteristics comparable to those of the button-type alkaline battery according to Comparative Example 2. In the button-type alkaline battery according to Comparative Example 2, zinc powder containing mercury was used as an anode active material.

The button-type alkaline batteries according to Examples 1 to 8 include a smaller amount of at least one metal selected from the group consisting of indium, bismuth, and tin as compared to the button-type alkaline battery according to Comparative Example 3 in which the indium-plated layer was formed on the anode sealing member beforehand.

In the button-type alkaline batteries according to Examples 1 to 8, swelling of the batteries or liquid leakage were not observed after high temperature storage. In the button-type alkaline battery according to Comparative Example 1, however, liquid leakage was observed.

INDUSTRIAL APPLICABILITY

The present invention can provide a button-type alkaline battery in which mercury-free zinc or a mercury-free zinc alloy is used as an anode active material. In the button-type alkaline battery of the present invention, the generation of hydrogen gas is inhibited and the battery is prevented from swelling and deteriorating in capacity without using processes, such as a plating process, which are not employed conventionally.

The invention claimed is:

1. A method of manufacturing an alkaline button battery comprising:
   an anode containing an anode active material and an alkaline electrolyte disposed in a sealed space formed by sealing a cathode housing with an anode sealing member; and
   a gasket interposed between the cathode housing and the anode sealing member;
   the method comprising:
   producing the alkaline electrolyte;
   forming the anode by mixing the alkaline electrolyte and the anode active material; and
   while the anode and anode sealing member are disposed to be in contact with each other, forming a metal layer on a surface of the anode sealing member to be located on a side of the anode by leaving the anode and the anode sealing member to stand for a predetermined period of time so that the anode and anode sealing member are no longer in contact with each other, and thus the metal layer forms only between the anode sealing member and the anode,
   wherein the surface of the anode sealing member to be located on the side of the anode includes copper or a copper alloy,
   wherein in the alkaline electrolyte producing step, indium hydroxide is dissolved in an alkaline aqueous solution containing water and alkali metal hydroxide, and then the alkaline aqueous solution is diluted with water to provide the alkaline electrolyte that includes the alkali metal hydroxide with a concentration of 20 wt. % to 35 wt. % and an indium ion with a concentration of 69 ppm or more,
   wherein a content of the alkali metal hydroxide is 45 wt % or more of a total amount of the water and the alkali metal hydroxide before the dilution of the alkaline aqueous solution with water,
   wherein the anode active material that is mixed with the alkaline electrolyte in the anode forming step includes a mercury-free zinc indium alloy, and a content of indium in the zinc indium alloy is 100 ppm to 800 ppm,
   wherein the anode includes the indium ion derived from the indium hydroxide,
   wherein the metal layer includes a base material containing zinc that is derived from the zinc indium alloy, and the indium that is derived from the indium ion and segregated in the base material, and
   wherein a content of the indium is 0.1 wt. % or more of a total amount of zinc and the indium that are contained in the metal layer.

2. The method of manufacturing an alkaline button battery according to claim 1, wherein the indium ion contained in the alkaline electrolyte has a concentration of at least 100 ppm.

3. The method of manufacturing an alkaline button battery according to claim 1, wherein the indium ion included in the alkaline electrolyte has a concentration of 100 ppm or more.

4. The method of manufacturing an alkaline button battery according to claim 1, wherein the content of the indium is 0.5 wt. % or more of the total amount of the zinc and the indium that are contained in the metal layer.

5. The method of manufacturing an alkaline button battery according to claim 1, wherein the content of the indium is 30 wt. % or less of the total amount of the zinc and the indium that are contained in the metal layer.

6. The method of manufacturing an alkaline button battery according to claim 1, wherein the content of the indium is 10 wt. % or less of the total amount of the zinc and the indium that are contained in the metal layer.

7. The method of manufacturing an alkaline button battery according to claim 1, wherein the content of the indium is 5 wt % or less of the total amount of the zinc and the indium that are contained in the metal layer.

8. The method of manufacturing an alkaline button battery according to claim 1, wherein the anode further comprises an indium compound mixed with the anode active material.

9. A method of manufacturing an alkaline button battery, said method comprising:
an anode containing an anode active material and an alkaline electrolyte disposed in a sealed space formed by sealing a cathode housing with an anode sealing member; and
a gasket interposed between the cathode housing and the anode sealing member;
the method comprising:
producing the alkaline electrolyte;
forming the anode by mixing the alkaline electrolyte and the anode active material; and
while the anode and anode sealing member are disposed to be in contact with each other, forming a metal layer on a surface of the anode sealing member to be located on a side of the anode by leaving the anode and the anode sealing member to stand for a predetermined period of time so that the anode and anode sealing member are no longer in contact with each other, and thus the metal layer forms only between the anode sealing member and the anode,
wherein the surface of the anode sealing member to be located on the side of the anode includes copper or a copper alloy,
wherein in the alkaline electrolyte producing step, indium hydroxide is dissolved in an alkaline aqueous solution containing water and alkali metal hydroxide, and then the alkaline aqueous solution is diluted with water to provide the alkaline electrolyte that includes the alkali metal hydroxide with a concentration of 20 wt. % to 35 wt. % and an indium ion with a concentration of 69 ppm or more,
wherein a content of the alkali metal hydroxide is 50 wt. % or more of a total amount of the water and the alkali metal hydroxide before the dilution of the alkaline aqueous solution with water,
wherein the anode active material that is mixed with the alkaline electrolyte in the anode forming step includes a mercury-free zinc indium alloy, and a content of indium in the zinc indium alloy is 100 ppm to 800 ppm,
wherein the anode includes the indium ion derived from the indium hydroxide,
wherein the metal layer includes a base material containing zinc that is derived from the zinc indium alloy, and the indium that is derived from the indium ion and segregated in the base material, and
wherein a content of the indium is 0.1 wt. % or more of a total amount of zinc and the indium that are contained in the metal layer.

* * * * *